Oct. 28, 1930.    J. J. M. GUEUX    1,780,127
APPARATUS FOR DELIVERING MEASURED QUANTITIES OF LIQUIDS
Filed Nov. 30, 1925    7 Sheets-Sheet 5
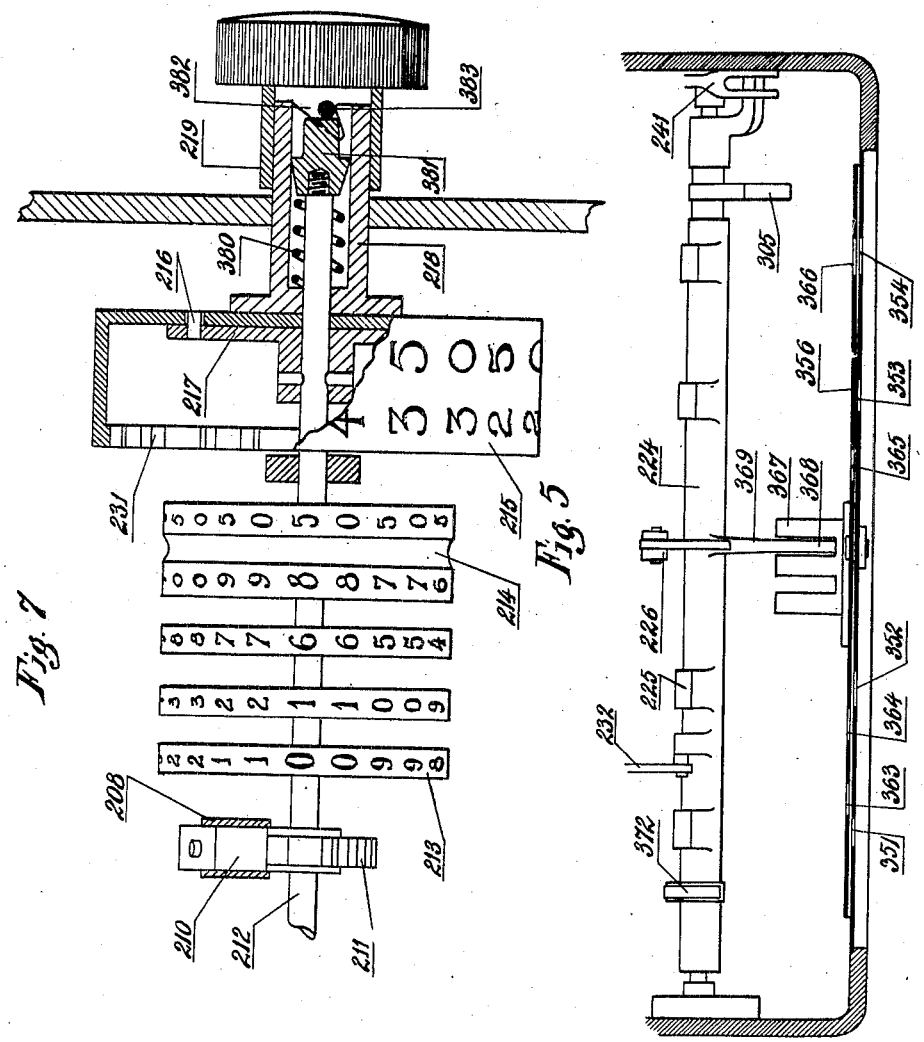
J. J. M. Gueux
INVENTOR
By: Marks & Clerk
Att'ys

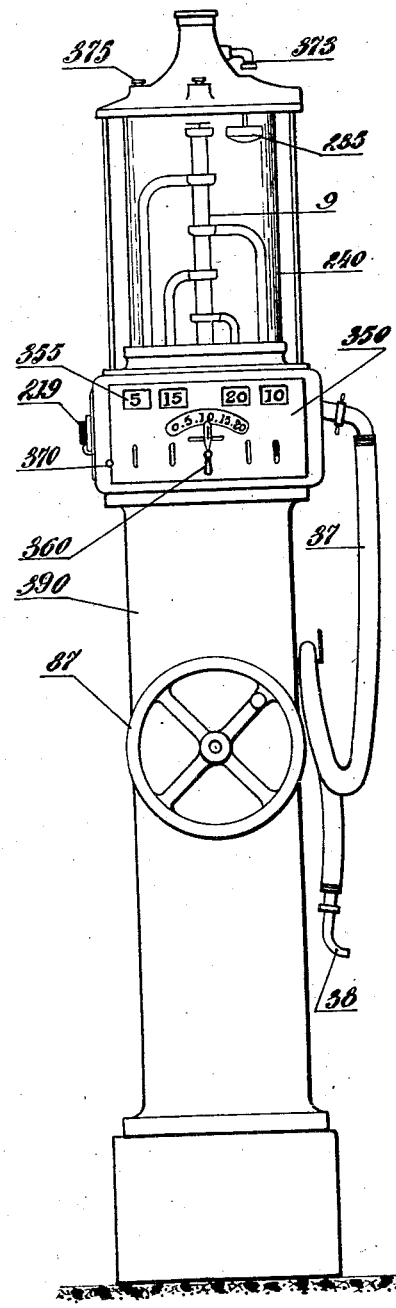

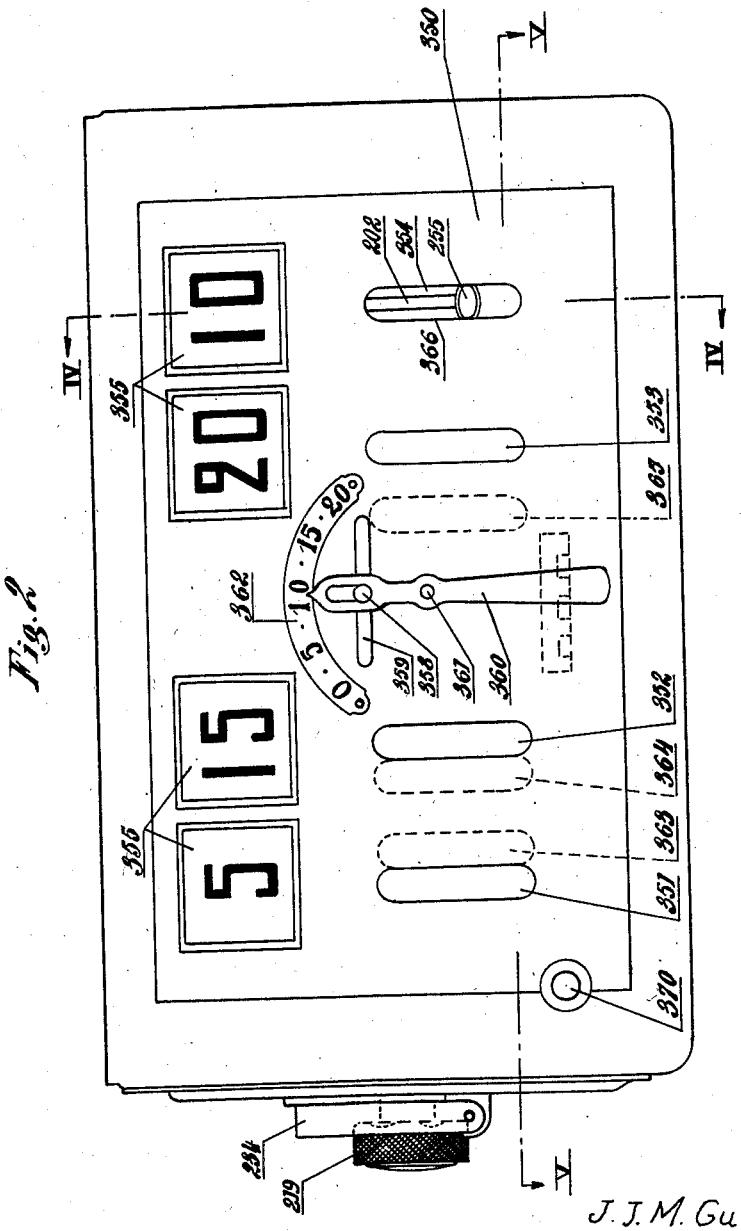

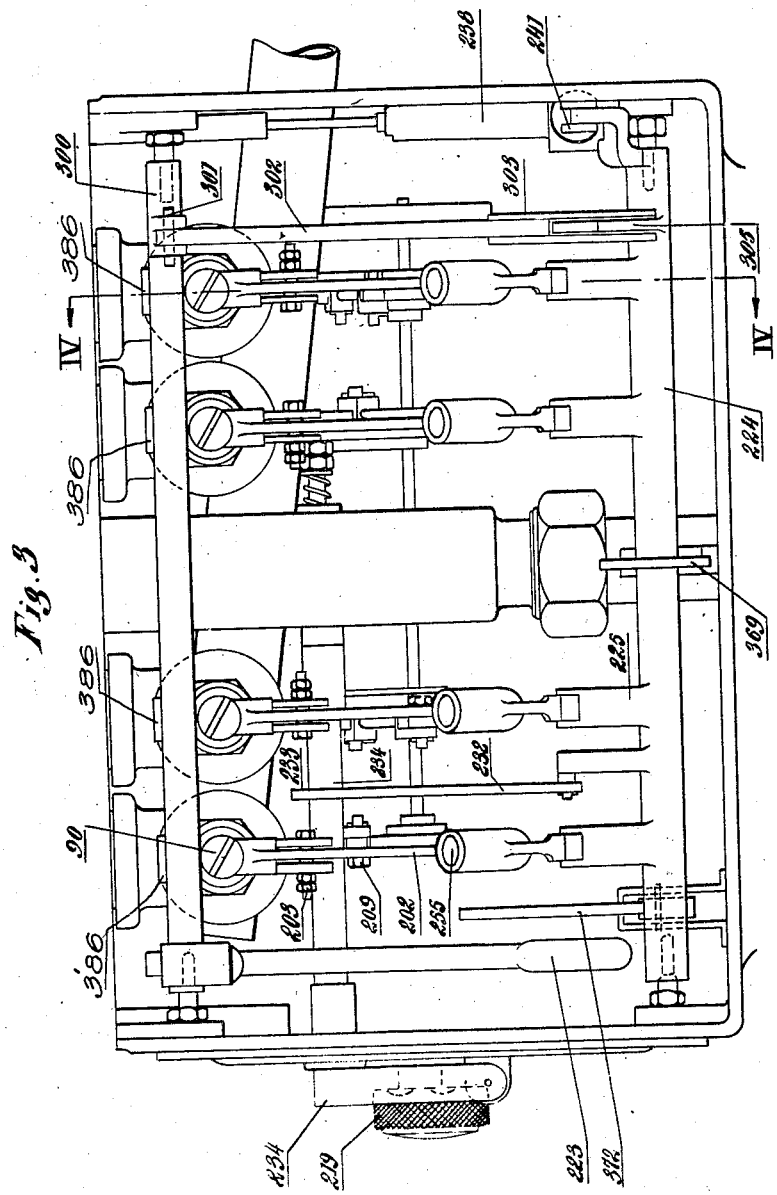

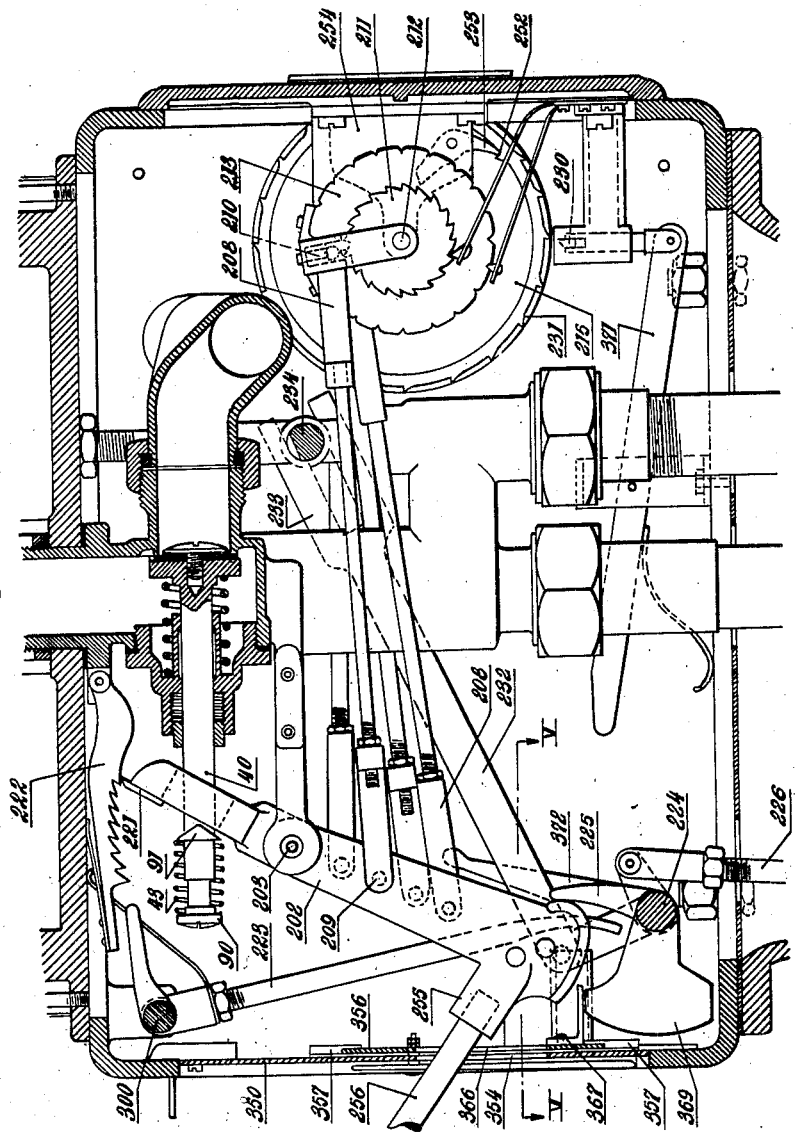

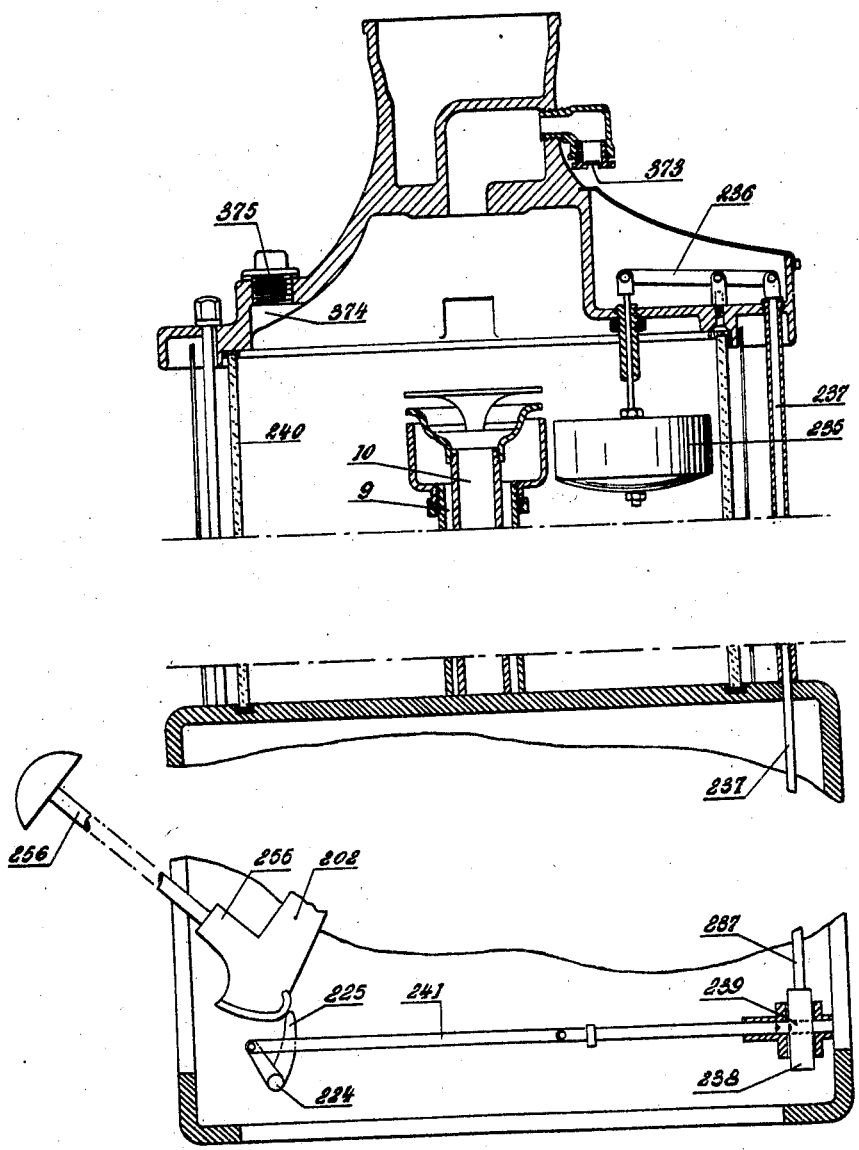

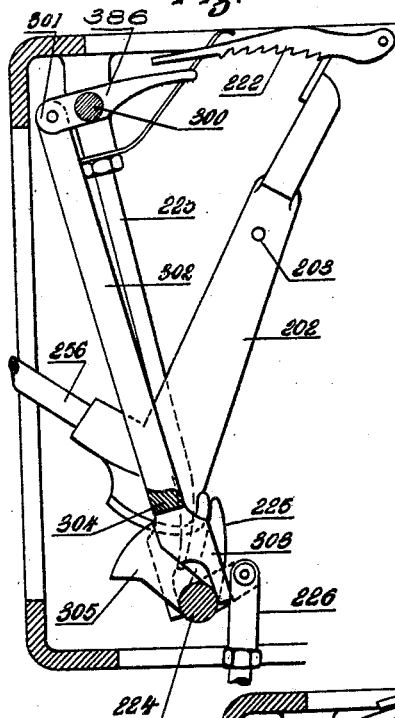
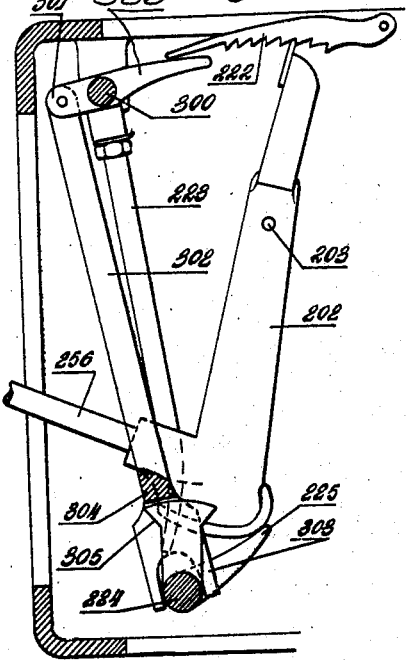
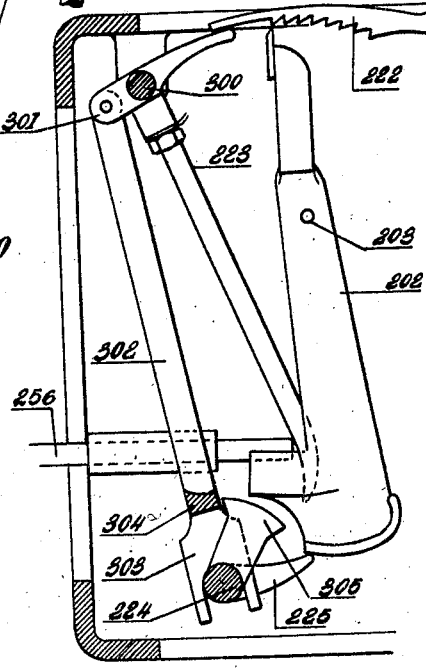

Patented Oct. 28, 1930

1,780,127

UNITED STATES PATENT OFFICE

JOSEPH JEAN MARIE GUEUX, OF PARIS, FRANCE

APPARATUS FOR DELIVERING MEASURED QUANTITIES OF LIQUIDS

Application filed November 30, 1925, Serial No. 72,259, and in France December 17, 1924.

The present invention relates to liquid measuring apparatus.

One of the objects of the invention is to provide means for preventing other than a predetermined quantity of liquid to be delivered once the apparatus has been set in operation.

Other objects will appear in the course of the detailed description now to be given with reference to the accompanying drawings, in which:—

Figure 1 is an elevation of the whole apparatus.

Figure 2 is a view on a larger scale of the plate shown in Figure 1.

Figure 3 is a view of the mechanism, the plate being removed.

Figure 4 is a section of the mechanism on the line IV—IV of Figures 2 and 3.

Figure 5 is a sectional plan on the line V—V of Figure 2.

Figure 6 is a simplified section of the apparatus showing the upper part of the bell and the attached parts.

Figure 7 is a view showing the totalizer of the apparatus in detail.

Figures 8, 9 and 10 are views showing certain parts of the mechanism in different successive positions.

The apparatus represented in Fig. 1 includes a measuring reservoir 240 mounted above a delivery control mechanism protected by plate 350. A pedestal 390 supports the delivery control mechanism and houses a pump actuated from the outside by handle 87.

The mechanism for feeding liquid to, and discharging liquid from, reservoir 240 is described in Patent No. 1,745,896, issued Feb. 4, 1930, and the present invention relates to operating and controlling mechanism for the latter.

Referring to Fig. 4, there are shown cock-operating rods 40 actuated by a handle 202 pivoted on a fixed shaft 203, the latter operating under the pressure communicated on rod-heads 90 by a ring 91 through the intermediary of a spring 43.

Handles 202 are formed with sockets 255 fitted with rods 256 engaging in slots 351, 352, 353, 354 corresponding to the various cocks to be operated and are connected at 209 to links 208 actuating ratchet wheels 211 keyed to shaft 212 of totalizer 213 through the intermediary of spring ratchets 210. The quantity of liquid delivered by each cock varies with the distance between 203 and points 209, shaft 212 rotating through an angle corresponding to the setting for any particular cock.

The totalizing counter mounted on shaft 212 (Figs. 4 and 7) includes a first drum 214 carrying 20 numbers in multiples of five, and two series of 10 figures arranged to properly correspond with the numbers inscribed on a drum 213. A large single delivery indicating drum 215, loosely mounted on shaft 212, is provided with 20 equidistant holes adapted to receive a pin 216 mounted on a disc 217 integral with shaft 212. Drum 215 is rotated by a knob 219 loosely mounted on the end of a sleeve 218 connected to the drum and acting on disc 217 through the intermediary of a head 381 maintained in extended position by a spring 380. Engagement between head 381 and knob 219 is assured by a pair of inclined slots 382 coacting with a spindle 383 passing through 219, spindle 383 being normally at the open ends of slots 382 in contact with head 381.

Drum 215 is returned to zero after each delivery operation in the following manner: Knob 219 is turned in the proper direction to draw sleeve 218 towards the former against the action of springs 380; drum 215 then moves away from disc 217, pin 216 disengages and the drum may be rotated back to zero position. By raising knob 219, the drum is again locked in position by pin 216. A stop 252 (Fig. 4), coacting with a spring ratchet 253 mounted on an extension 254 of the frame, facilitates the return of the drum to zero, the stop acting on the ratchet when the zero appears in the outside indicator.

Each handle 202 terminates in a nose 221 adapted to engage, as soon as the handle is moved, in the teeth of finger 222 preventing backward movement of the handle. The four fingers 222 corresponding to the four handles may be raised simultaneously by four projections 385 formed on a shaft 300 integral with a lever 223. The lower arm of the lever 223 is in line with an orifice 370 in plate 350 (Fig. 2) adapted to receive operating rod 256 hereinbefore described. The lower end of each handle 202 bears on a lever 225 carried by a transverse shaft mounted in suitable bearings and is acted on by a spring (not shown) tending to maintain contact between each handle and lever. When handle 202 is actuated, lever 225 is thrust backward (Figs. 9 and 10) and shaft 224 rotates through the proper angle.

Shaft 300 carries an extension 301 (Figs. 3, 8, 9 and 10) pivoted to a rod 302 terminating in a fork 303 passing around shaft 224. Rod 302 carries an integral shoulder 304 positioned to engage with a stop finger 305 integral with shaft 224.

When handle 202 moves from the position represented in Fig. 8 to that shown in Fig. 9, a small lever 225 rotates shaft 224 so as to bring stop finger 305 into contact with shoulder 304. Since handle 202 is then engaged in one of the notches of finger 222, it cannot be raised by lever 223, the latter being locked by the engagement between stop elements 304 and 305, and the return of the handle to inoperative position becomes therefore impossible. To effect this latter operation, the handle must be moved downward into the position represented in Fig. 10, shaft 224 turning so as to allow stop finger 305 and shoulder 304 to move out of engagement. When the delivery operation has been completed lever 223 can be moved so as to move shoulder 304 of rod 302 behind stop 305 (Fig. 10). Handle 202, being then disengaged from finger 222, may be moved into inoperative position but shaft 224 cannot immediately follow because of the blocking action of elements 304, 305. It is only after the return of lever 223 to inoperative position that shaft 224, integral with stop 305, resumes its original position.

Another safety device operated by shaft 224 prevents the drain cock of reservoir 240 being opened while a delivery operation is in progress and vice versa and consists of a link 232 (Figs. 3, 4 and 5) carrying a fork 233 having an enlarged end opening, and a cylindrical locking key 234 fitting between the prongs of fork 233 and provided with a flattened locking surface. The various operative elements are designed so that: (1) when the various handles 202 are inoperative, key 234 may turn in the enlarged end of element 233 and so permit opening of the drain cock, and (2) as soon as any single handle 202 is operated, the flattened portion of key 234 engages in the narrow portion of fork 233 and operation of the drain cock becomes impossible.

Shaft 224 also controls a safety device preventing movement of any of the delivery cocks until the liquid in reservoir 240 attains its original upper level (Fig. 6). This safety device consists of a float 235 positioned inside reservoir 240,—a lever 236,—a rod 237,—a piston 238 connected to rod 237 and having an orifice 239 formed therein,—and a rod 241 actuable by an arm connected to shaft 224 to move a stop-pin into orifice 239 when float 235 is in raised position (as shown in Fig. 6). When float 235 is below its uppermost position, piston 238 presents its solid portions to the stop pin actuated by rod 241 and the operation of any of the delivery cocks becomes impossible.

The delivery control (Figs. 1 and 2) includes a plate 350 having four vertical slots 351, 352, 353 and 354 formed therethrough in line with sockets 255 of cock-handles 202,—indicating plates 355 showing the amount of liquid delivered by each cock,—a companion plate 356 adapted to slide in guides 357 attached to plate 350 (Fig. 4), said plate having slots 363, 364, 365 and 366 formed therethrough of the same dimensions at slots 351 to 354,—a pin 358 connected to plate 356 and engaging in a horizontal slot 359 formed in plate 350 and also in a longitudinal slot formed through a control handle 360,—a shaft 361 carrying handle 360,—and an indicating scale 362 showing the quantities of liquid to be delivered. The slots in plate 356 are positioned so that when handle 360 indicates a certain quantity, the slots in plates 350 and 356 corresponding to said quantity move into line with one another and permit a rod 256 to be inserted into the socket 255 of the cock operating handle 202 corresponding to the quantity of liquid shown on the indicator. Since only one pair of slots in plates 350 and 356 are in line for any given indicator's setting, it is impossible to manipulate more than one handle 202 at a time.

Means are provided for preventing manipulation of any handle while another has been pushed backward and consists of a sort of rack 367 attached to plate 356, said rack having two notches 368 formed therein,—and a toothed sector 369 keyed to shaft 224 and adapted to engage in notches 368. Since shaft 224 carries levers 225 bearing against handles 202, said shaft turns as soon as any handle is operated and causes sector 369 to engage with rack 367 so as to lock plate 356 in position. At the same time lever 223, actuating fingers 222, moves into line with an opening 370 in plate 350 and the operation of said lever has to be effected by rod 256. From the foregoing, it will be seen that cock handles 202 and lever 223 cannot be manipulated at the same time.

Means are provided for locking drum 215 of totalizer 213 in position after each movement of handles 202 and for preventing said drum from moving by momentum beyond the proper indicating position consisting of a series of teeth 231 formed on the periphery of the drum (Fig. 4) engaging with a spring stop 230 pivotally connected to a lever 371, said lever being actuated by a finger 372 mounted on shaft 224 which rotates each time any handle 202 is operated.

Fig. 6 shows certain details of reservoir 240 intended to facilitate cleaning of the latter and diminution of fire risk. Flap valve 373 allows fresh air to enter the reservoir during each delivery operation and closes automatically during filling so as to force the excess air charged with combustible vapors to escape through overflow 9. Openings 374 fitted with plugs 375 permit the insertion of a cleaning instrument into the reservoir.

Claims:

1. In apparatus for delivering measured quantities of liquids, a plurality of valves, handles associated with said valves, a safety device for preventing two valves from being simultaneously opened, said safety device including a transverse shaft operated coincident with the valves, a notched rack member, a sector carried by said shaft and co-operating with said notched rack member, a sliding plate carrying said rack member, an outer plate located outwardly of the sliding plate and provided with a slot for each valve handle, a handle for actuating said sliding plate, said sliding plate being provided with slots arranged whereby only one slot at a time coincides with a slot of the outer plate.

2. In apparatus for delivering measured quantities of liquids, a plurality of valves, handles associated with said valves, a safety device for preventing closure of a valve only partially opened, said device including a transverse shaft operated incident with the valves, a rod having a forked extremity, a stop on said shaft, a shoulder on said rod coacting with said stop, the forked end of said rod engaging the transverse shaft, retaining fingers associated with said handles, and a lever connected with said rod and adapted to actuate said fingers, said handle being adapted to be engaged and retained by said fingers until released by actuation of said fingers.

3. In an apparatus for delivering measured quantities of liquid, a delivery valve, a drain cock including a spindle having a flattened surface, and a safety device for preventing the drain cock from being opened while the delivery valve is open, said safety device including a shaft operated coincident with the valve, a link connected with said shaft, and a fork carried by said link coacting with the flat face of the spindle for preventing rotation thereof, and having a widened portion adapted, when brought into position, to permit rotation of the spindle.

4. In an apparatus for delivering measured quantities of liquid, a plurality of valves, operating handles for said valves, a shaft, a plurality of fingers on said shaft each contacting with a handle in order to rotate said shaft when one handle is operated, and safety means associated with said handles and actuated by said shaft when thus rotated.

In testimony whereof I hereunto affix my signature.

JOSEPH JEAN MARIE GUEUX.